United States Patent [19]
Ishida

[11] Patent Number: 5,170,473
[45] Date of Patent: Dec. 8, 1992

[54] COMMUNICATION COMMAND CONTROL SYSTEM BETWEEN CPUS

[75] Inventor: Miyuki Ishida, Kawasaki, Japan

[73] Assignee: Fujitsu Limited, Japan

[21] Appl. No.: 439,329

[22] Filed: Nov. 21, 1989

[30] Foreign Application Priority Data

Nov. 22, 1988 [JP] Japan .................... 63-293694

[51] Int. Cl.⁵ .......................................... G06F 13/38
[52] U.S. Cl. ............................... 395/325; 364/DIG. 1; 364/228.3; 364/230.1
[58] Field of Search .............. 364/DIG. 1; 395/200, 395/325, 725

[56] References Cited

U.S. PATENT DOCUMENTS

| | | | |
|---|---|---|---|
| 4,414,620 | 11/1983 | Tsuchimoto et al. | 364/DIG. 1 |
| 4,639,856 | 1/1987 | Hrustich et al. | 364/DIG. 1 |
| 4,807,109 | 2/1989 | Farrell et al. | 364/DIG. 1 |
| 4,852,021 | 7/1989 | Inoue et al. | 364/DIG. 1 |

Primary Examiner—Thomas M. Heckler
Attorney, Agent, or Firm—Staas & Halsey

[57] ABSTRACT

A communication command control system among a plurality of CPUs includes a control apparatus for transmitting an acknowledge signal to a request signal and thereafter for transmitting receiving command data and status data. The control apparatus comprises a local system priority determining circuit for determining a priority of signal processor commands from a plurality of CPUs and a local/remote system priority determining circuit for determining the priority between a local SIGP command controller and a remote SIGP controller. The data transfer period of the response request is detected when a response request is transmitted from another CPU of SIGP command control apparatus to the local and local/remote priority determining circuits, by counting the transfer period of command data after the response request is received and the acknowledge signal is transmitted and by counting the transfer period of the status data received from the other CPU. The system judges the destination of a CPU-ID representing the destination of said acknowledge signal, command data and status data.

9 Claims, 6 Drawing Sheets

COMMUNICATION COMMAND CONTROL SYSTEM BETWEEN CPUS

BACKGROUND OF THE INVENTION

1. Field of the Invention

The present invention relates to a control system for controlling a signal processor command (called SIGP command hereinafter) between central processor units (CPUs) in a system having a plurality of CPUs and a memory control unit (MCU) internally equipped with a SIGP command control apparatus and more particularly to a control system for minimizing the number of signal lines and for determining a priority in a reasonable manner.

2. Description of the Related Art

In a system comprising a plurality of CPUs, a system is required for communicating between them.

It may be necessary to inquire whether or not a requested process can be executed, or it may be necessary to interrupt an already-requested process.

In such a case, the CPU sends a SIGP command to a CPU on the other party and determines the state of the requested process based on the response signal. The control system for controlling such a SIGP command is usually provided within a memory control apparatus.

FIG. 1 shows a block diagram representing a conventional system for controlling a SIGP command.

The SIGP request from CPU0 or CPU1 is set in port 1 or 2. The priority is then determined by first priority circuit 5 and transmitted to port 7 and the remote system console interface (RSCI) apparatus.

The SIGP request from the remote system console interface (RSCI) apparatus is set in port 8 and the priority between ports 8 and 7 is determined by second priority circuit 11.

The priority of the master system is higher in second priority circuit 11. Thus, when no SIGP request exists in the port of the master system, the port of the slave system is selected. When the local system site is selected by first priority circuit 5 and second priority circuit 11, register 16 (BUSY 1/2) is set. In addition, register 17 (SIG-CPU) is set corresponding to CPU-ID of the CPU selected by the first priority circuit and second priority circuit, and a COMMAND-ACK signal is transmitted to the corresponding CPU through port 15.

The CPU (source CPU) for receiving the COMMANDACK signal then transmits command data by the DATA-OUT bus at a certain timing. This data is set in register 3 or 4 and the data selected by selector 6 is transmitted to register 9 and the remote system console interface (RSCI) apparatus. Command data from the remote system console interface (RSCI) apparatus is set in register 10 and an output from both register 10 and register 9 is selected by selector 12 to be applied to address check circuit 13 and selector 14.

Address check circuit 13 determines the data's destination CPU and set register 18 (SIGNALED-CPU). Register 18 stores a flag of CPU 0/1 upon a transmission of COMMAND-IN (port 19) and upon a transmission of DATA-IN (registers 20 and 21). Address check circuit 13 receives a CPU 0/1 on-line signal, CPU 0/1 a floating CPU address signal and a power ready signal. Then it transmits a COMMAND-IN signal through port 19 and a DATA-IN signal through registers 20 or 21, to the corresponding CPU.

Thereafter, the CPU receiving COMMAND-IN transmits the status data via a STATUS-OUT bus and a DATA-OUT bus at a certain timing. The status data is transmitted to the source CPU through register 3 or 4, selector 6, register 9 or 10, selectors 12 and 14 and, register 20 or 21 by referring to register 17 (SIGNAL-ING-CPU). Selector 12 receives DATA-OUT/STATUS-OUT, outputs STATUS-OUT to address check circuit 13 and outputs DATA-OUT/STATUS-OUT to selector 14. Selector 14 receives DATA-OUT from address check circuit 13. Selector 14 performs a selection using the same destination CPU-ID as register 18 in case of a command, and using the same REQUEST source CPU-ID as register 87 in case of a status.

In the conventional process system of the SIGP command, BUSY1/BUSY2 of register 16 is "on" only when the priority is obtained by both the first priority circuit and the second priority circuit. In other words, BUSY1/BUSY2 of register 16 is not set when the priority is not obtained by the second priority circuit. Therefore, when the priority can be obtained by a first access of the local system in the first priority circuit but a second access of the remote system is selected in the second priority circuit, then the first access is kept waiting in the first priority circuit.

Therefore, in order to avoid the situation in which a third access having a lower priority than the first access is selected in the first priority circuit while the first access is kept waiting, the priority in the first priority circuit should be fixed. For example, the younger numbered CPU always has the priority in the first priority circuit.

Therefore, in order to effectively obtain the priority order between CPUs, the priority may be given interchangeably to CPU0 or CPU1. Then there is a problem that when priority is obtained by the remote system in the second priority circuit and the process is returned to the first priority circuit, CPU1, which is different from CPU0 previously selected, is selected and after the process completion, priority is again given to the remote system. Thus, during the period in which priority should be given to CPU 0 in the first priority circuit, priority is given to the remote system in the second priority circuit. Then, when priority is returned to the local system in the second priority circuit, priority is again returned to CPU 1 in the first priority circuit. Thus, priority of CPU 1 is always maintained although priority is alternately changed in the first priority circuit. Thus, the same priority is given to the same CPU.

In the prior art system, respective central processing apparatuses and the memory control apparatuses require various control signals. When the scale of the system is large and thus, the number of CPUs and MCUs is large, a lot of control lines are required. This causes great difficulty in constructing and processing the system.

SUMMARY OF THE INVENTION

An object of the present invention is to provide a control system for controlling a communication command between CPUs, in which priority can be assigned and various control signal lines are not separately required.

A feature of the present invention resides in a communication command control system between a plurality of CPUs comprising unit for controlling a SIGP command of a communication command between said CPUs, unit for transmitting and receiving command- /data and responses for executing said SIGP command in a coded manner using a data bus, a first priority determining circuit for determining the priority of the SIGP command from a plurality of CPUs, unit for maintaining information designating that the ID of the CPU has been selected by said priority determining circuit and that the process is being executed, a second priority determining circuit for determining the priority between SIGP command control apparatuses of remote systems, unit for maintaining the information representing the ID of the SIGP command control apparatus selected by the priority determining circuit and ensuring that the process is being executed, unit for calculating the data transfer period for the response request when the response request is transmitted to said first and second priority determining circuits from another CPU or SIGP command control apparatuses while the process is being executed and unit for maintaining a trigger signal representing a response request, and unit for providing a priority to a CPU or a SIGP command control apparatus which issues said response request while replying to its request and returning to the process of the CPU or SIGP command control apparatus to which the priority is previously given after the process relating to the response request is completed.

The present invention executes a SIGP command and processes, command data and a response signal by using a common data bus, thereby greatly decreasing the number of control lines. A first priority circuit for determining the priority of a plurality of CPUs, a circuit for maintaining a CPU's ID selected by the first priority circuit and a busy-signal-maintaining circuit for recognizing that the process is now being executed are provided within the SIGP command control apparatus. A second priority circuit for determining the priority between SIGP command executing control apparatuses, a circuit for maintaining the ID of the control apparatus selected by the second priority circuit and a circuit for maintaining a busy signal indicating that the process is being executed are also provided within the SIGP command control apparatuses. A circuit for calculating the data transfer period of the response signal to the SIGP command, and a circuit for maintaining a trigger signal representing the response signal in respective priority circuits are provided in respective priority circuits. By switching a logic for selecting the priority during an effective period of a response signal, the priority can be determined.

DESCRIPTION OF THE PREFERRED EMBODIMENT

An embodiment of the present invention will be explained by referring to the attached drawings.

Figure 1:
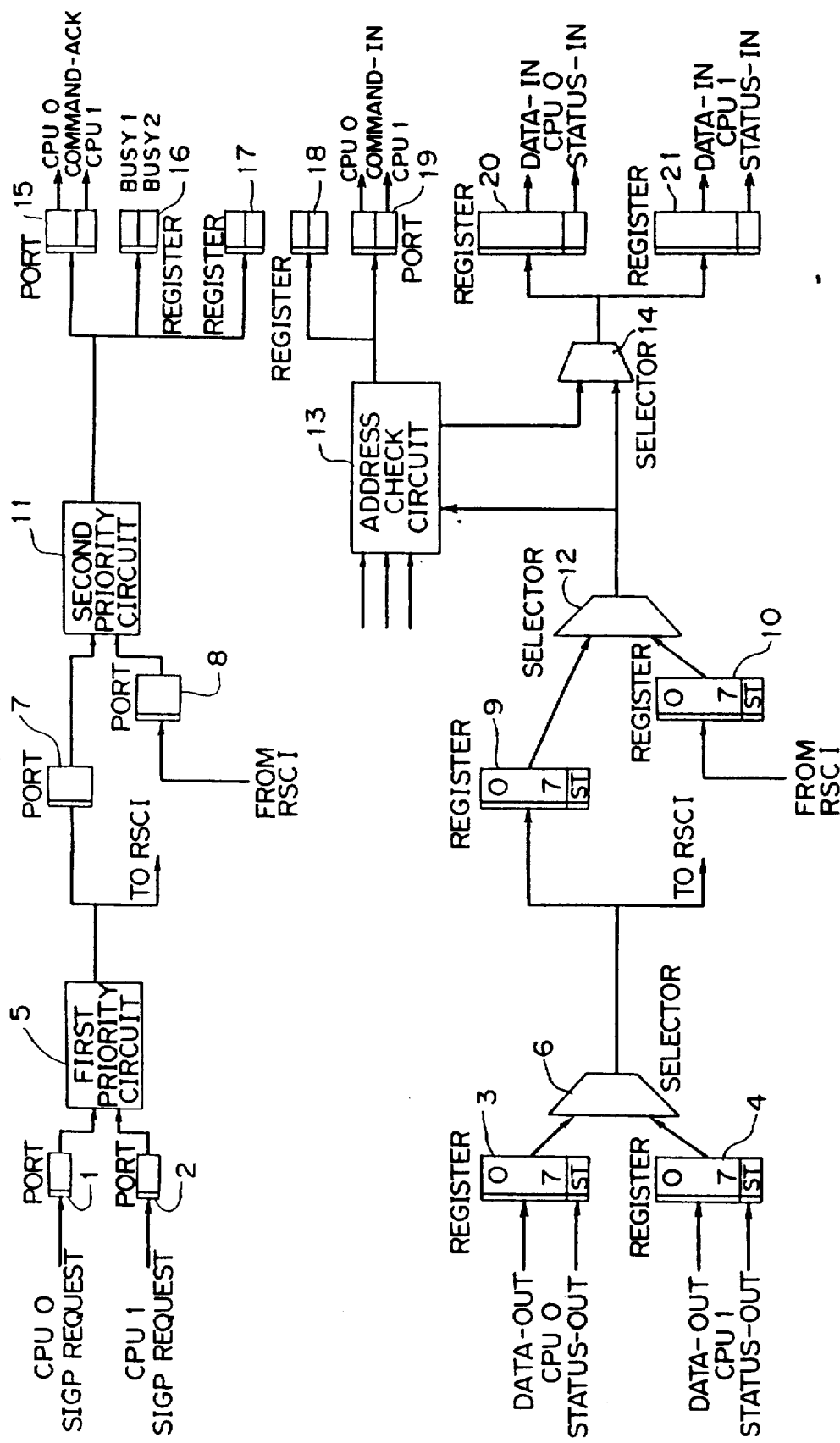
FIG. 1 is a block diagram of the prior art communication command control system.
Figure 2:
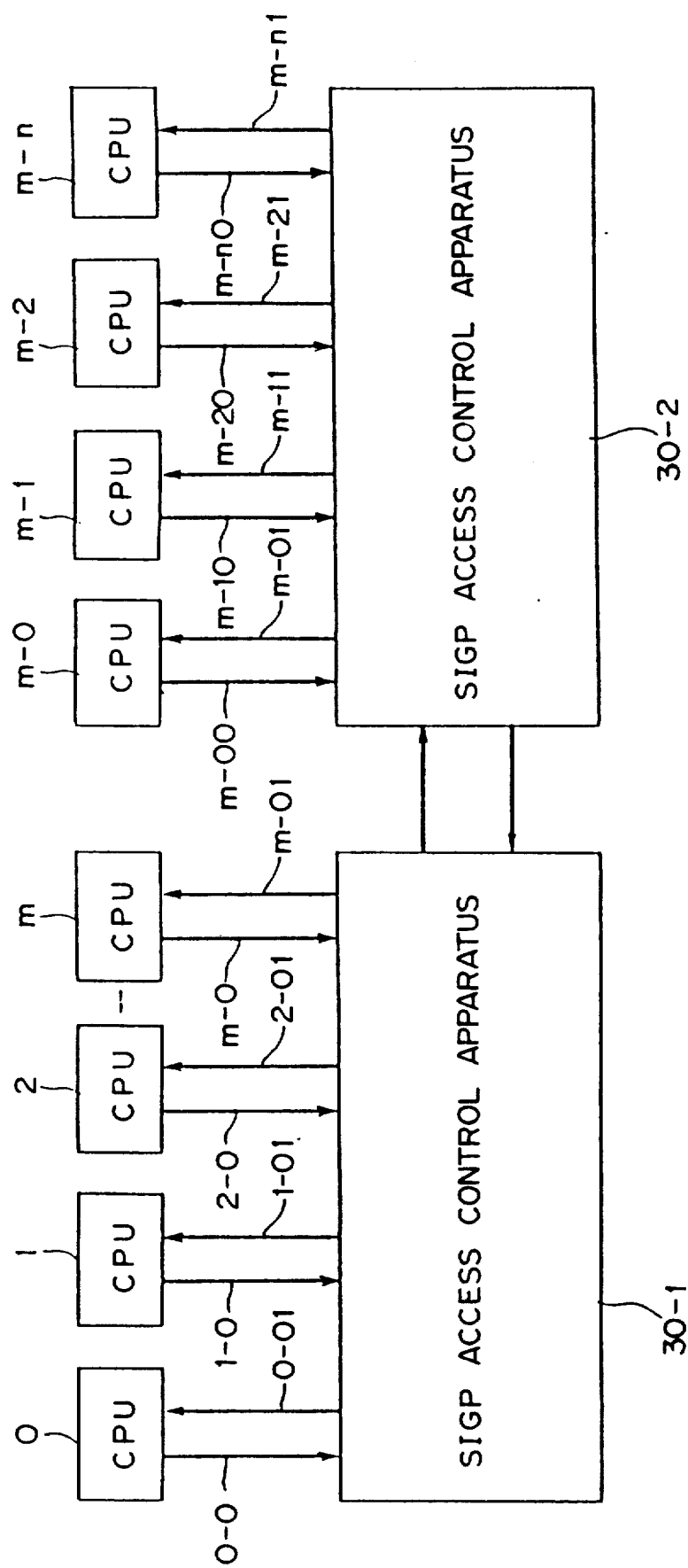
FIG. 2 is a block diagram of a system to which the present invention is applied.

FIG. 2 shows an embodiment of a system to which the present invention is applied. 0 to m and m-0 to m-n represent CPUs, 0-0 to m-n1 show buses and 30-1 and 30-2 show SIGP access control apparatuses.

In FIG. 2, any one of CPU0 to CPUm can communicate with another CPU connected to SIGP access control apparatus 30-1. It can produce a SIGP command and communicate with the CPU of the object through SIGP access control apparatus 30-1. When a communication is conducted with any one of CPUs m-0 to m-n connected to SIGP access control apparatus 30-2, the communication is conducted with the CPU of the object through SIGP control apparatuses 30-1 and 30-2.

Figure 3:
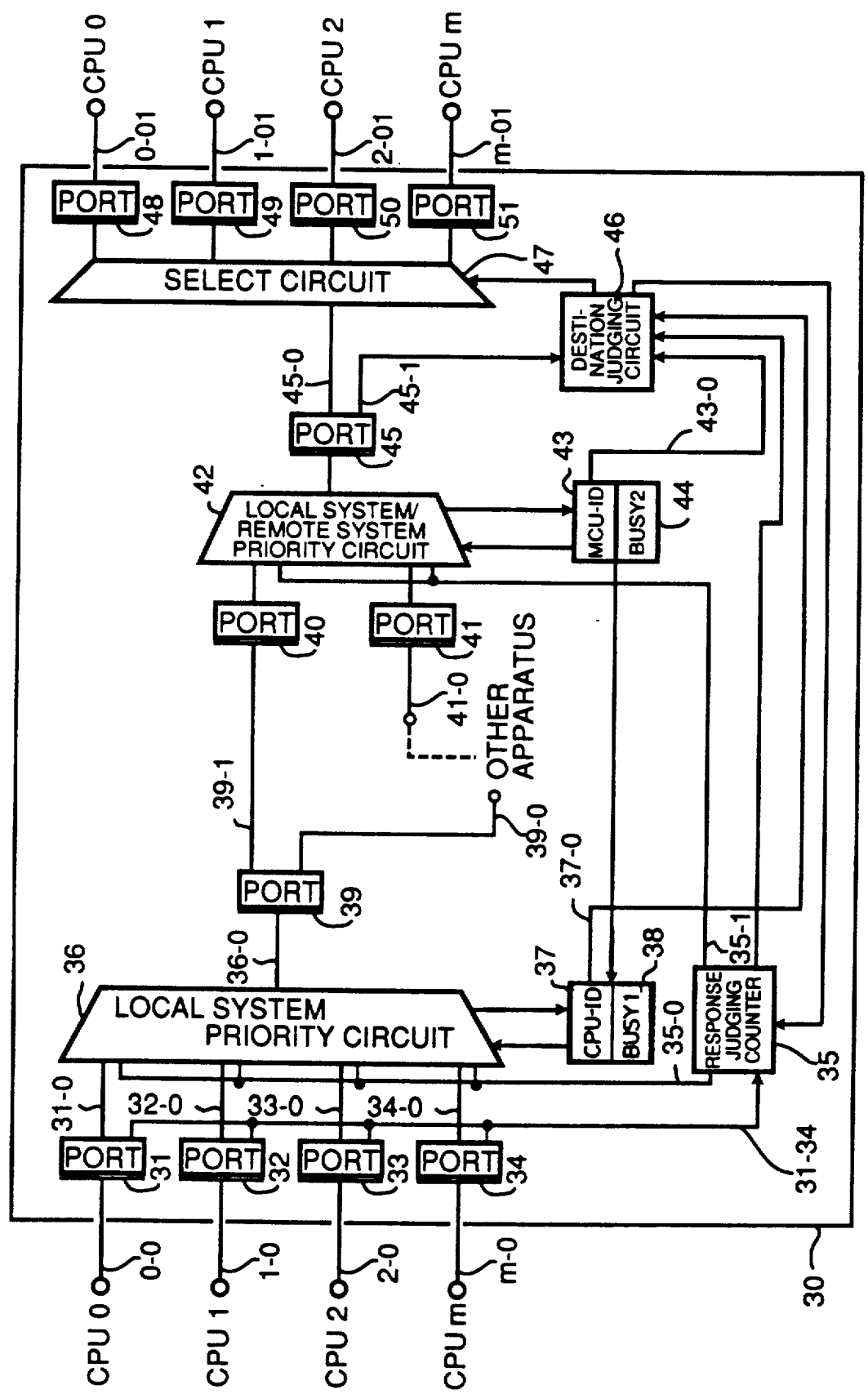
FIG. 3 is a block diagram of an embodiment of the present invention.

FIG. 3 shows a block diagram of one embodiment of the present invention and shows the structure of the SIGP access control apparatus 30 shown in FIG. 2. In FIG. 3, a SIGP command from a plurality of CPUs (0 to m) is stored in ports 31 to 34 and is applied to local system priority circuit 36 by signal lines 31-0 to 34-0. Local system priority circuit 36 selects the next CPU-ID designated and assigned a priority by CPU-ID maintaining circuit 37 by referring to CPU-ID maintaining circuit 37.

If a SIGP command does not exist in the corresponding ports 31 to 34 of the next CPU-ID designated by CPU-ID maintaining circuit 37, the priority is determined in a cyclic manner so that the next CPU-ID can be selected sequentially.

The CPU-ID whose priority is determined by the local priority circuit is immediately set in CPU-ID maintaining circuit 37 and simultaneously BUSY 1 circuit 38 is set. Further, the SIGP command is set in port 39 via signal line 36-0 and is transmitted to the other apparatus (remote system) by signal line 39-0 and to port 40 by signal line 39-1. Therefore, the priority between the port 40 and the port 41 to be set by signal line 41-0 from other apparatus is determined by local system/remote system priority circuit 42.

Local system/remote system priority circuit 42 is referred to MCU-ID maintaining circuit 43. The remote system is selected if the content of MCU-ID maintaining circuit 43 is local and the local system is selected when the content thereof is related to the remote system. Where a SIGP command does not exist on the opposite side to the content designated by the MCU-ID, for example, where the MCU-ID shows a local system and a SIGP request exists in port 40 but a SIGP request does not exist in port 41, the system having the SIGP request (namely, the side of port 40) is selected regardless of the MCU-ID.

The MCU-ID selected by the local system/remote system priority circuit 42 is immediately set in MCUID maintaining circuit 43 and simultaneously BUSY 2 circuit 44 is set. The SIGP command is set in port 45. It is then transmitted to selector 47 by signal line 45-0 and to destination judging circuit 46 by signal line 45-1.

Where port 45 contains the request, and CPU-ID and MCU-ID transmitted by signal line 37-0 and 43-0 select the local system, destination judging circuit 46 transmits the response signal (acknowledge (ACK) signal), responsive to the request and subject to a coding on the data bus, to any one of the corresponding ports 48 to 51 designated by CPU-ID. A counter is initiated simultaneously and it is recognized that the command data is transmitted from the CPU transmitting the ACK signal at a fixed timing.

The command data issued from the CPU (request source CPU) receiving the ACK signal is transmitted via the same path as the request to destination judging circuit 46, which determines which CPU will receive the command data. The CMD signal is thereby coded and transmitted to the data bus.

When the status signal from any one of the CPUs receiving the CMD signal is inputted to any one of ports 31 to 34, it enters response judging counter 35 through control line 34-1 and the priority of the local priority circuit previously selected by CPU-ID circuit 37 is temporarily switched to CPU-ID sending the status signal for a certain period by means of response judging counter 35 and control line 35-0.

The priority of the local/remote system is similarly switched by control line 35-1 to the system sending the status signal. However, when the contents of CPU-ID circuit 37 and MCU-ID circuit 43 are not changed, and the status data is returned to the request source CPU, CPU-ID circuit 37 and MCU-ID circuit 43 are referred to by destination judging circuit 46 to perform coding of the status signal. The coded status signal is thereby transmitted to the data bus of CPU ports 48 to 51 corresponding to the CPU designated by the content of CPU-ID circuit 37.

When the status data transfer process is completed, the local system priority and local system/remote system priority are returned to the original priority determined by CPU-ID circuit 37 and MCU-ID circuit 43.

Figure 4:
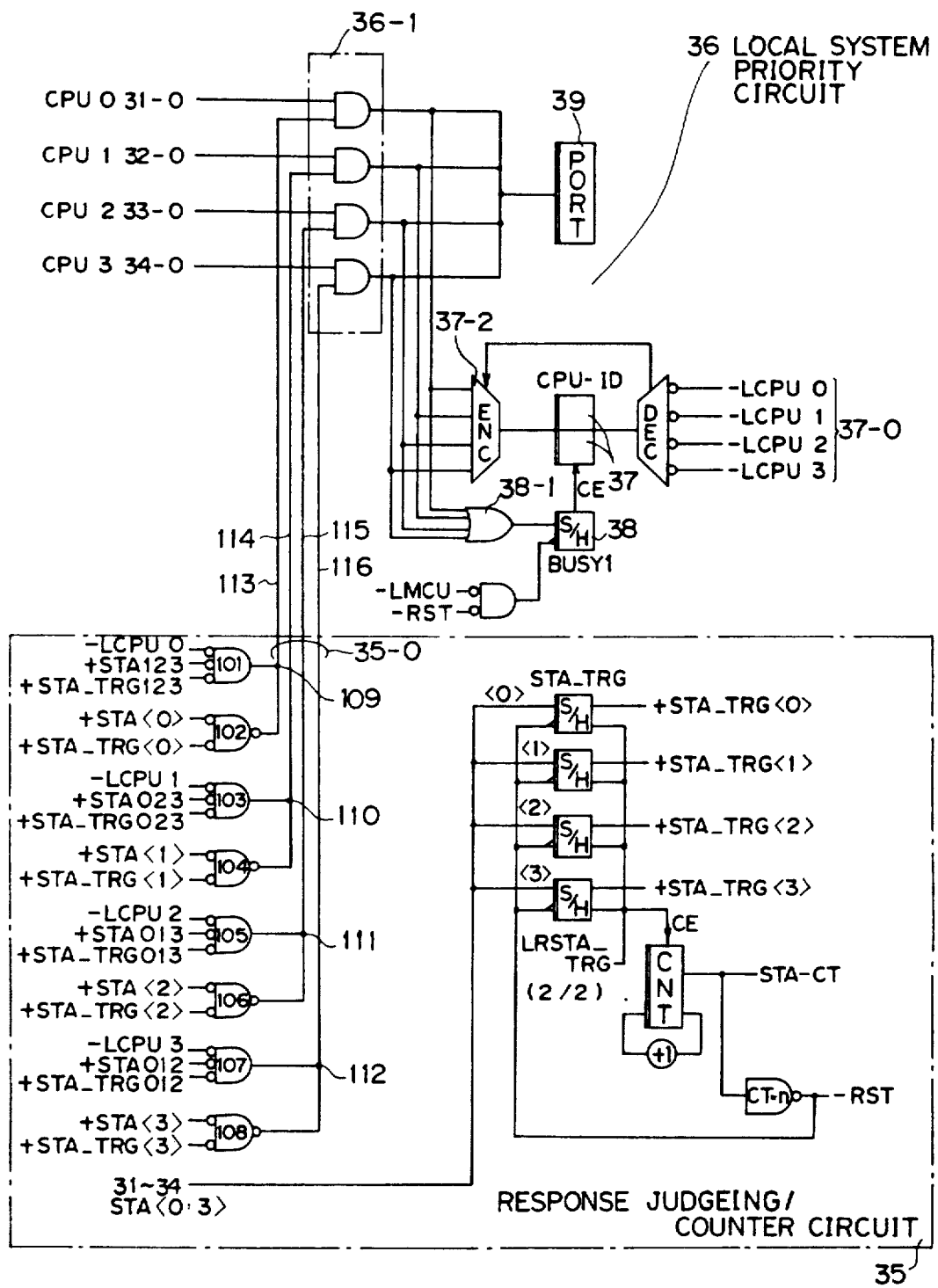
FIG. 4 is a more detailed block diagram of the embodiment shown in FIG. 3.
Figure 5:
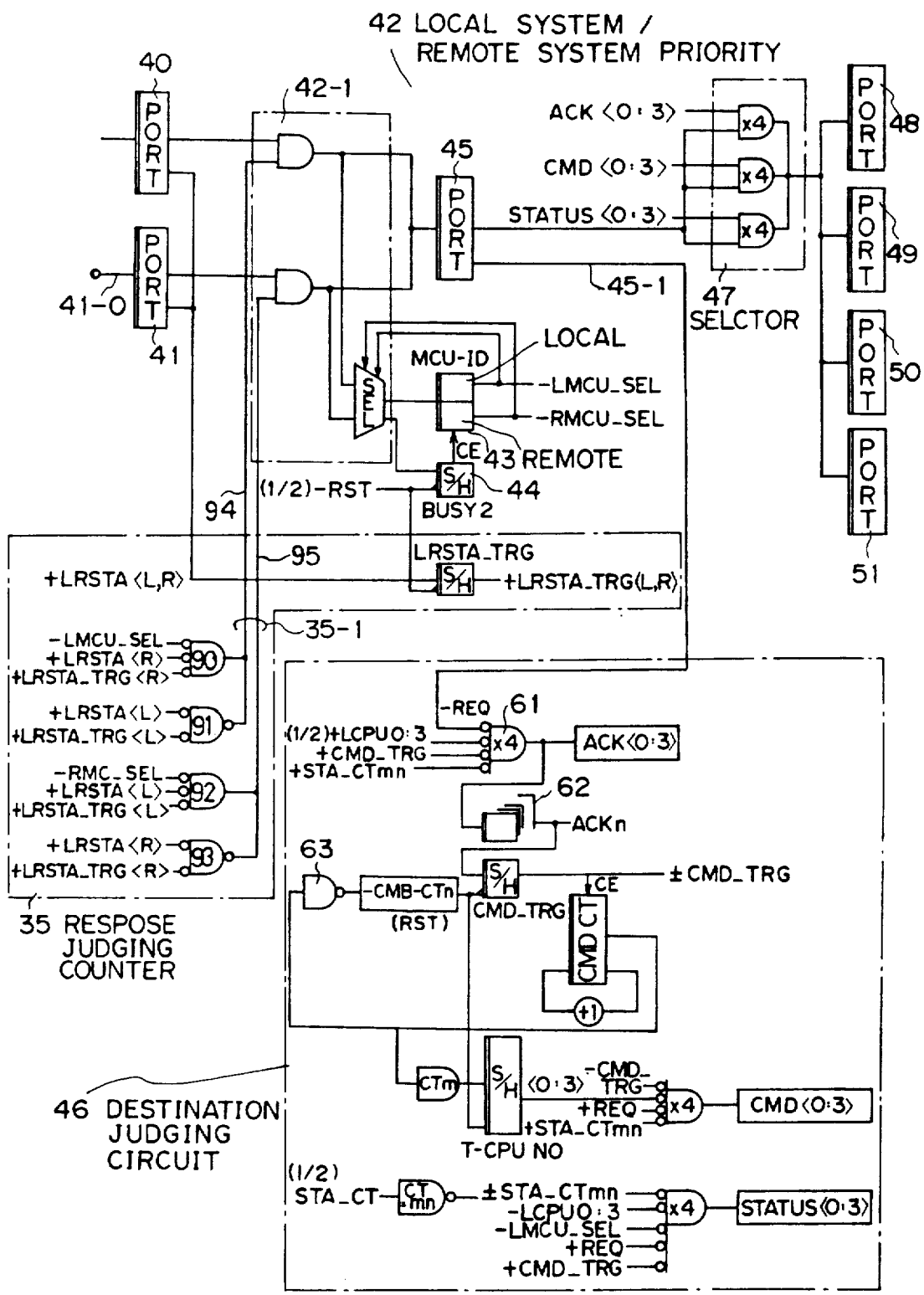
FIG. 5 is a more detailed block diagram of the embodiment shown in FIG. 3.

FIG. 4 shows a detailed block diagram of a local priority circuit and response judging/counter, and FIG. 5 shows a block diagram of local system/remote system priority circuit 42 and destination judging circuit 46 which are used for a communication between two CPUs. When, in this embodiment, CPU0 issues a request for communication and the acknowledgement signal is returned to a CPU0 through a control circuit comprising SIGP access control apparatus 30 of the present invention, CPU0 transfers command data to CPU1 through the control circuit. When CPU1 receives the command data, the status signal representing the present state of CPU1 is returned to CPU0 through the control circuit and the timing chart of this operation is shown in FIG. 6.

Figure 6:
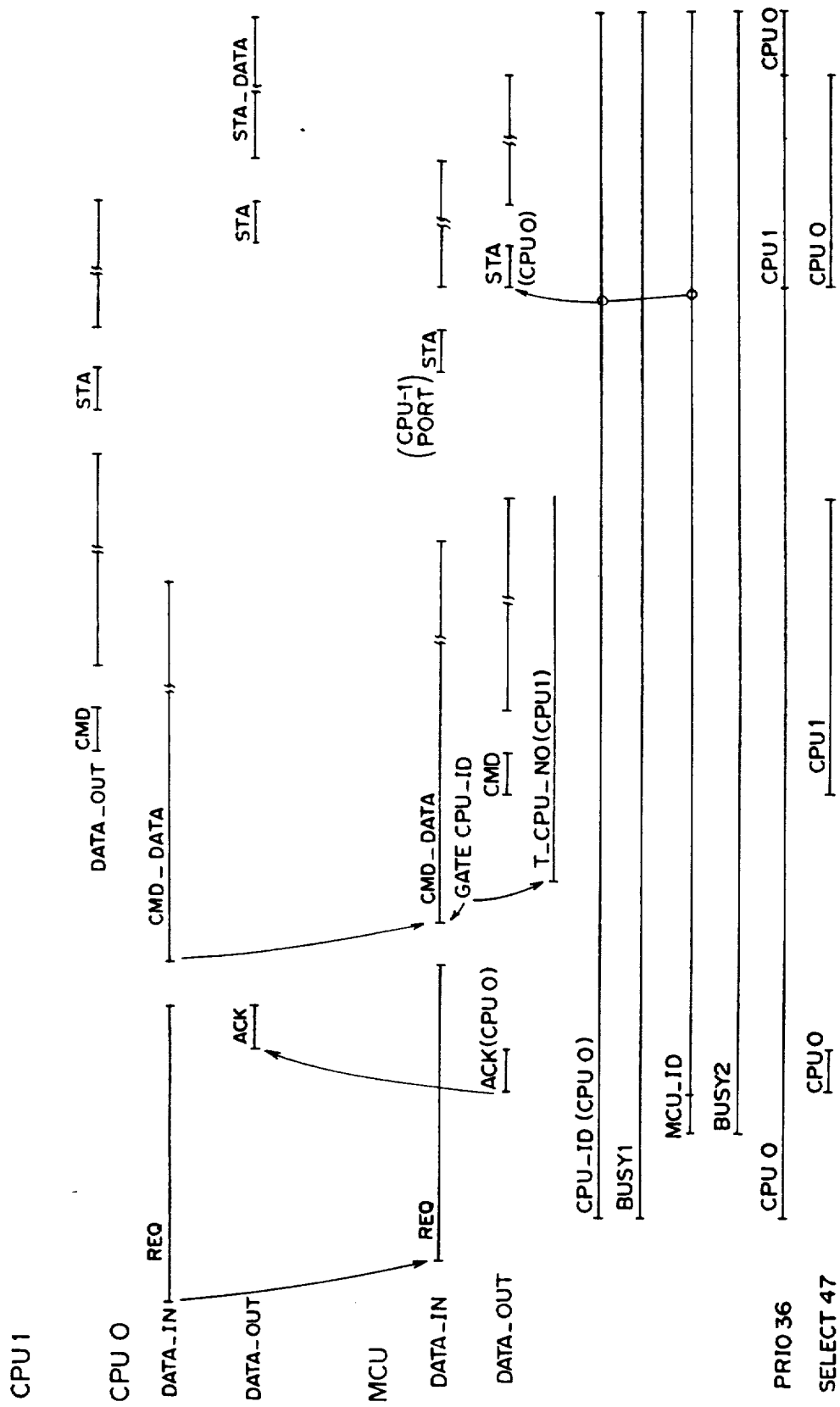
FIG. 6 is a timing chart of the block diagram shown in FIGS. 4 and 5.

The operation of the circuits shown in FIGS. 5 and 6 are explained by referring to the timing chart shown in FIG. 6. CPU0 inputs a request signal onto signal line 31-0 as a data-in signal. Then at the next clock the CPU0 port 31-0 receives a request signal in the MCU, namely, in the control circuit of the present invention. If (1,1) corresponding CPU3 is set in CPU-ID register 37 inside local priority circuit 36, the output of the decoder circuit DEC, namely, LCPU signal is active upon "0" and the signal 37-0 becomes (1, 1, 1, 0). Thus, it becomes 0 only when the LCPU signal is 3 and it becomes 1 in all other cases. The LCPU signal is inputted to gates 101, 103, 105, 107 of response judging/counter 35. When the minus LCPU 0 signal is "1", it is reversed at the input of gate 101. Thus, the output of gate 101 becomes "0". Similarly, when a minus LCPU1 signal is "1", the output of gate 103 becomes "0". Minus LCPU 2 signal is also "1" and thus the output of gate 105 is turned to "0". As minus LCPU 3 signal is "0", the output of gate 107 becomes "1" because STA012 and STA-TRG 012 are not in status modes and are "0" and minus LCPU 3 signal is also "0". At the other gates 102, 104, 106 and 108, the input signals to the gates is related to the status mode and are 0 at an initial stage, thereby producing "0" output at inverters provided at the output of the gates 102, 104, 106 and 108. Therefore, only gate 107 of output gates 101 to 108 produce "1" output. Connecting points 109, 110 and 111 and 112 represent a wired OR circuit. Therefore, only the fourth signal line 116 out of signal lines 113, 114, 115, 116 to be inputted to local priority circuit 36 becomes 1 and the other signal lines 113, 114 and 115 become 0. These signal lines 113, 114, 115 and 116, are connected to a selector 36-1 provided at the input portion in the local system priority circuit 36. The communication request signal is inputted to this selector 36-1 from CPU0, 1, 2 and 3 respectively. When the request signal is transmitted from CPU0 only line 31-0 becomes 1 and the other lines become 0 to be input to selector 36-1, as lines 31-0, 32-0, 33-0 and 34-0 respectively correspond to CPU0, 1, 2 and 3. Selector 37-2 outputs a logic in accordance with the request signal by using AND gates inside the selectors 37-2 when at least one of the request signals is 1. Then, the 4 bits of the output are changed from the present status (0, 0, 0, 1). In this case, 4 bits of the output are changed from the present status (0, 0, 0, 1) to the state (1, 0, 0, 1) as the bit corresponding to CPU0 is changed from 0 to 1. The output signal indicating that the request signal is sent from CPU0 is produced, and then the priority encoder encodes a request signal from CPU0 which has the highest priority in the signal (1, 0, 0, 1) and produces an output 2 bits (0, 0) and in the next clock the register for the CPU-ID is changed from (1,1) to (0,0). The setting of the CPU-ID 37 is effective when the chip-enable CE is 1 and at least one enable signal exists in the output from the selector 36-1 if the request signal from the outside, namely, from CPU side exists.

The output of OR circuit 38-1 and the output of sampling hold circuit 38 is changed to "1" and the result is produced as the chip enable signal.

In this case the content of CPU-ID 37 changes from (1,1) to (0,0) and sample hold circuit 38 is changed to produce a busy signal. The signal for resetting sample hold circuit 38 is produced when minus LMCU and minus reset RST are (0,0). Therefore, the request signal from CPU0 is selected by local system priority circuit 36 to set (0,0) in CPU-ID 37. CPU ID 37 is decoded by decoder DEC and only minus LCPU0 becomes 0, all other minus LCPUs become 1. This signal is inputted to response judging-counter circuit 35. Therefore, signal line 113 becomes 1 and other signal lines 114, 115 and 116 become 0 and they again apply signals to selector 36-1. Selector 36-1 transmits the request signal to the local/remote priority circuit in the next stage. In this case the output of selector 36-1 produces a signal whose one bit corresponding to CPU0 is 1 and whose other bits are 0. Thus, the result of circuit 37-1 comprising the priority encoder becomes (0,0) and thus (0,0) is always set in CPU-ID 37. Thus, the request signal maintains the state designating that it is the request of CPU0 for a certain period, namely, a state of (0,0) is kept up to a reset timing. Therefore, according to the timing chart, the request signal of data DATA-IN inputted to the MCU produces a CPU-ID signal representing CPU0 at the next clock, thereby making BUSY1 active. Port 39 sets (1,0,0,1) corresponding to the request signal from CPU0. This is shown by a line designating CPU0 in PRIO36 in a timing chart shown in FIG. 6. Sample hold circuit 38 and counter 39 shown in response judging-counter circuit 35 operates when the status signal arrives.

Next, the operation of receiving the request signal and returning the acknowledge signal will be explained by referring to the circuits shown in FIGS. 4 and 5 and the timing chart shown in FIG. 6.

The output from local system priority circuit 36 is entered from port 39 into port 40. Port 41 also receives a signal from the corresponding port 39 connected to the corresponding local system priority circuit 36 of MCU in a remote system. Local system/remote system priority circuit 42 selects a local CPU or remote CPU selected with a particular priority. The selected signal designating the local system/remote system CPU is set in MCU-ID 43. If the remote CPU is selected, the local system side of MCU-ID 43 is "1" and the remote CPU side of MCU-ID 43 is "0". That is, the signal is a 0 active signal. Thus, upon a timing of 0, the local system is selected. That is, if the remote system is selected, the minus RMCU-SEL signal is "0" and the minus LMCU-SEL is "1". The minus LMCU-SEL signal is inputted to gate circuit 90 in response to judging counter circuit 35 and if the minus LMCU-SEL signal is "1", the output of gate 90 is turned to "0". On the other hand, if the minus RMCU-SEL signal is "0", the output of gate 92 is turned to "1". Namely, when both the LRSTA and the LRSTA-TRG signals are "0", then, signals 94 and 95 which are applied to local system/remote system priority circuit 42 is "0" and "1" respectively. These signals are applied to selector 42-1 in the input side in local system/remote system priority circuit 42. In this state, the output of local system priority circuit 36 is inputted to port 40. When a MCU-ID 43 selects the remote system and then the signal from the local system arrives, the second selector selects the request signal of the local system with a particular priority. The local system/remote system then alternates the priority, changing the MCU-ID from the previous state (1,0) to the new state (0,1) and thereby to selects the local system. The selection of the priority by local system priority circuit 36 should have the same priority sequence for a long period with regard to CPU0 to CPU3. The priority sequence is not fixed and is changed in a cyclic manner at the priority encoder, for example, in a sequence, 0,1,2,3,0,1,2 . . . Similarly, in the local system/remote system priority circuit, the system basically alternates between the local system and the remote system. When the remote system is operating and the local system signal arrives, the local system is selected. If the local system is operating and then the remote system signal arrives, the local system is selected. If the request arrives alternately from the local system and the remote system, the selection is also performed alternately. If requests are not received continuously for a certain period, the selector selects the local system for the next timing. Therefore, in this sense, the local system has a higher priority than the remote system. The signal designating whether the system is local or remote and which is selected by selector 42-1 is set in MCU-ID 43. When the system is changed from the remote system to the local system, the MCU-ID becomes (0,1) and this state continues for a certain period. Sample hold circuit 44 produces BUSY 2 signal and this is set if at least one request signal appears at the output of the selector 42-1. A clock for MCU-ID is disabled by a clock enable signal equal to busy BUSY2 and upon an existence of the request, the previously set MCU-ID (0,1) is maintained. When the local system is selected the select signal from port 40 is set in port 45 through selector 42-1. Signal 45-1 from port 45 corresponds to the minus REQ signal of gate circuit 61 at destination judging circuit 46 as it is a 0 active signal. The plus LCPU signal is inputted to this gate and when the minus REQ signal is 0, the minus LCPU signal representing CPUs 0 to 3 outputted from the local system priority circuit is requested by CPU0 and then (0, 1, 1, 1) signal is inputted.

When the system is in the command mode, CMD-TRG signal is 0, thus producing the active signal, and in the case of status modes, STA-CTmm signal is 0, thus representing the active signal. As the request signal from port 45 is 0, four bit signal from LCPU 0:3 is output as the output from gate circuit 61 is 0. When this four bit signal is changed to an acknowledge signal, it is outputted to ports 48, 49, 50 and 51, respectively, corresponding to CPU0 1, 2 and 3, through selector 47 to produce the acknowledge signal. The acknowledge signal is returned to CPU0.

In FIG. 6, after CPU-ID represents CPU0 and BUSY 1 rises, the remote system or local system is selected. BUSY 2 becomes active when MCU-ID is the local system. In the next clock period determined by MCU-ID, the acknowledge signal is returned as the data out signal. Namely, selector 47 selects the acknowledge signal the acknowledge signal for the request signal is returned to CPU 0 as shown in FIG. 6. The acknowledge signal is transferred to CPU 0 on the transmission side and CPU 0 receives the acknowledge signal. CPU 0 resets the request signal. In the clock next to the reset state, CPU 0 returns a command signal to the other CPU 1 through the control circuit. Then, the MCU transmits the command signal in a bit-parallel manner in four-bit units. This is the command transmission mode. The command data is transmitted for a predetermined time period after the MCU is given to CPU 0. Therefore, as shown in FIGS. 4 and 5, namely, the minus REQ signal from port 45, a 0 state of CMD-TRG signal, 0 state of STA-CTmm and 0 level of CLCPU 0.3 are inputted to gate 61. Then the OR signal of ACK(0:3)is applied to flip flop 62 to be delayed for a predetermined period. Next, flip flop 62 outputs ACKN signal to be set in sample hold circuit S/H, thereby raising the CMD-TRG signal. This is considered as the starting time of the command mode. Then, the counter CMD-CT is chip-enabled. The counter CMD-CT starts at this time and increments the content by one. The number of the counter CMD-CT is subjected to a bit parallel processing by the command data and is incremented by one during the transmission of the command data or is decremented until it reaches 0 after a predetermined time is set. After the counter operation is completed, the signal representing counting completion provides a CMD-CTM signal through inverter 63, which is applied to a sample hold circuit S/H for CMD-TRG as a reset signal. The destination address for the command data is stored in the register T-CPN 0. When the signal is transmitted from CPU0 to CPU1, only the bit corresponding to CPU1 is 1. The other bits are 0. Therefore, four bits (0,1,0,0) are set and the bit designating the destination is input to gate circuit 61. Gate circuit 61 receives a reversed signal of minus REQ signal from port 45 and completes the request mode. Then the CMD-TRG is 0, that is, it is not the command mode and is not the status mode. Thus, if the SIA-CTmn is 0, gate circuit outputs the data of T-CPUN0. In this case, the signal (0, 1, 0, 0) representing CPU1 is applied to selector 47 and ports 48, 49, 50 and 51 as four bits signal. That is, the command data inputted to local priority circuit 36 via signal line 31-0 is applied to ports 40 and 41 for selecting the local system and port 45 and when the signal is transmitted in a bit parallel manner the command trigger signal is in an enable state. This is shown by a line of CMD-DATA in the timing chart of FIG. 6. Therefore, this constitutes a transmission of a command signal in a state designated by T-CPU-NO namely CPU 1. Selector 47 selects CPU1. The signal (0, 1, 0, 0) of T-CPU-NO representing CPU1 is outputted from ports 48, 49, 50 and 51. Then, as shown in FIG. 6, a data- out signal is inputted to CPU1 from MCU. Then, the command data received by MCU from CPU 0 is transmitted from the MCU to CPU 1. When CPU1 receives command data, it transmits a status signal of CPU 1 to the MCU. The MCU recognizes that the status signal is transmitted in accordance with the signal (0, 1, 0, 0) designating CPU1, as STA 0:3. The STA signal is set in a sample hold circuit for STA-TRG to provide a TRG signal. The STA signal and STA-TRG signal are inputted to gate circuits 101 to 108 of response judging circuit 35. If the status mode is not extablished, the above recited request signal is returned to the local system priority circuit 36 as the information of CPU-ID in accordance with the present priority. In other words, when the status mode is established, for example, when the status data information representing CPU1, namely, (0, 1, 0, 0) is inputted and either STA-1 or STA-TRG1 becomes 1 in gate circuit 104, the output of the gate receiving the STA1 becomes 1, thereby enabling the output of the gate circuit to be 1. Thus, "1" is applied to the selector 36-1 of the local priority circuit 36 and only the status data from the signal line 32-0 corresponding to CPU1 is transferred to port 39.

Then CPU-ID 37 retains the data (1, 0) representing CPU0. Therefore, the status signal from CPU1 is controlled to be transmitted to CPU0. At least one 1 exists in the STA-TRG signal while the status data is being transmitted, LRSTA-TRG is the output of the OR circuit of STA-TRG signal and provides 1. That is, the status mode is designated and then the signal is used as an chip-enable signal for the counter to perform a counting while the status data is being transmitted. STA-CT is 1 during the status mode. When STA data is transmitted, namely, STA-CT is 1, the signal is inputted to destination judging circuit 46 shown in FIG. 5. When STA-CT is 1, STA-CTmm becomes 0. Then LCPU0-3 are the data of CPU-ID to designate (0,0) and the signal representing CPU0 which is a destination of the status signal decoded to the signal (0,1,1,0). LMCU-SEC is the content of an MCU-ID register representing the local system, thus making the 0 active signal representing the local system 0.

When, it is not in the request mode, the plus request REQ is the output of port 25 and is 0. When it is not in the CMD mode, CMD-TRG signal is also 0. Therefore, the status data corresponding to the CPU 0:3 is reversed to provide the signal (1, 0, 0, 0). The status signal is a selection signal for the AND gate in selector 47. The output of port 48 is made effective and the output from ports 49, 50 and 51 are subjected to a masking. Therefore, port 48 transmits a status signal from port 45, to CPU0. The status signal is a signal from the signal line 12-0 inputted to the selector 36-1 of the local system priority circuit 36. This is the status data from CPU1. As shown in the timing chart of FIG. 6, the status data from CPU1 is inputted to MCU with a delay and is transmitted from MCU to CPU0, also with a delay.

As described above, the present invention has the advantage that a SIGP command can be executed by a relatively small number of control signal lines in an apparatus for controlling the SIGP command in a system comprising a plurality of central processor units and a memory control apparatus.

The priority of the priority sequence determining circuit is not fixed and can be varied, thereby enabling a reasonable priority to be determined.

What is claimed is:

1. A communication command control system, comprising:
 a local system, including:
  local central processing units;
  a local signal processor (SIGP) command control apparatus operatively connected to said local central processing units; and
 a remote system, including:
  remote central processing units;
  remote SIGP command control apparatus operatively connected to said remote central processing units;
 each of said SIGP command control apparatuses comprising:
  means for transmitting and receiving SIGP commands and response requests,
  first priority determining means for determining a priority sequence of the SIGP commands transmitted from said corresponding central processing units,
  means for storing information representing an ID of one of said corresponding central processing units which is selected by said first priority determining means,
  second priority determining means for determining a priority sequence between the SIGP command control apparatus of the local system and the SIGP command control apparatus of the remote system,
  means for storing the information representing an ID of the SIGP command control apparatus selected by said second priority determining means,
  means for calculating a data transfer period for a response request of the response requests when the response request is transmitted to said first and second priority determining means from one of said central processing units or said SIGP command control apparatuses;
  means for maintaining a trigger signal representing the response request, and
  means for providing priority of one of said central processing units or one of said SIGP command control apparatuses which issues the response request for the data transfer period of the response request and for returning to a prior one of the central processing units or a prior one of said SIGP command control apparatuses to which the priority was previously given after a process relating to the response request is completed.

2. A communication command control system comprising:
 a local system, including:
  local central processing units;
  a signal processor (SIGP) command control apparatus operatively connected to said local central processing units; and
 a remote system, including:
  remote central processing units;
  SIGP command control apparatus operatively connected to said remote central processing units;

each of said SIGP command control apparatuses comprising:
- local system priority determining means for determining a priority sequence of signal processor commands transmitted from the plurality of central processing units and for selecting one of the central processing units based on the priority sequence,
- means for storing CPU-ID data of the one of the central processing units selected by said local system priority determining means,
- local system/remote system priority determining means for determining a priority between the local signal processor command controller apparatus and the remote signal processor control apparatus,
- means for storing a MCU-ID of the local or remote signal processor command control apparatuses selected by the local system/remote system priority determining means,
- mean for counting a data transfer period relating to the response request when the response request is transmitted from another of the central processing units or said local or remote signal processor command control apparatuses to said local system priority means and said local system/remote system priority determining means, said counting means comprising,
  - first counting means for counting a transfer period of command data after the response request is received and an acknowledge signal is transmitted, and
  - second counting means for counting a transfer period of status data received from another of the central processor units, and
  - means for judging a destination of the CPU-ID representing the destination of the response request, the command data and the status data.

3. The communication command control system according to claim 2, wherein said central processing units comprise:
- CPU-I means for transmitting the response request and command data,
- CPU J means for transmitting an acknowledge signal through said local or remote signal processor control apparatuses, for receiving the command data and for transferring the status data representing a present state of said CPU J means in a time divisional manner.

4. The communication command control system according to claim 2, wherein said local system priority determining means comprises:
- first selector means for receiving a response request and for producing a logical output in accordance with the response request when at least one response request exists in accordance with the priority sequence,
- a first register means for storing the CPU-ID;
- a second register means for storing a MCU-ID;
- decoder means for decoding the CPU-ID and;
- response judgement/counter block means for receiving the decoded CPU-ID if a present status is not in a command mode or not in a status mode, and;
- a port to store a local request signal;
- second selector means for transmitting the response request with a higher priority to the local system/remote system priority means in a next stage to determine a priority with which the remote system or the local system is selected an for providing a signal representing whether the selected signal is from the local system or the remote system which is stored in said second register for selecting a local request signal with a priority such that the selected local request signal is stored in said port, and wherein
- said means for judging the destination includes means for determining a CPU port corresponding to content of the first register and for transferring the response request as the acknowledgement signal obtained from the response request.

5. The communication command control system according to claim 2, further comprising:
- means for setting a request signal to zero when the communication command control system is not in a command mode and the communication command control system is also not in a status mode, which enable the request signal to be changéd to the acknowledge signal and for outputting the signals to the port corresponding to respective central processing units and for returning the acknowledge signal to a source CPU.

6. The communication command control system according to claim 2, further comprising:
- CPU J means for receiving the command data;
- CPU I means for receiving the acknowledge signal and for returning the command data to said CPU J means
- . control means for transmitting the command data,
- sample/hold means for storing a predetermined acknowledge signal by a command trigger signal to raise a CMD-TRG signal to form a starting point for the command mode so that said first counting means is enabled, for counting the command data while that command data is being transmitted and when the counting operation is completed, for resetting the sample/hold means and
- means for transmitting the command data to said CPU J means based on the stored data in a first register while the counting operation is being executed.

7. The communication command control system according to claim 2, further comprising:
- CPU I means for receiving the command data,
- CPU J means for transmitting the status data to said CPU I means when said CPU I means receives the command data, and wherein
- said first counter means includes means for counting a status data communication period starting with a trigger signal and wherein
- said destination judgment means includes means for determining an output port corresponding to the CPU-ID so that the status data is transmitted to said CPU I means which is the source of the response request.

8. The communication command control system according to claim 2, wherein
- said local system priority determining means includes means for determining the priority of the CPUs within said local system in a cyclic manner.

9. The communication command control system according to claim 2, wherein
- said local system/remote system priority determining means includes means for determining the priority between said local system and said remote system interchangeably or alternatively when the response request from said local system and said remote system is made and for selecting said local system when the response request is received and when no response request is produced for a certain period.

* * * * *

UNITED STATES PATENT AND TRADEMARK OFFICE
CERTIFICATE OF CORRECTION

PATENT NO. : 5,170,473
DATED : December 8, 1992
INVENTOR(S) : Ishida

It is certified that error appears in the above-identified patent and that said Letters Patent is hereby corrected as shown below:

IN THE ABSTRACT:

Line 13, "CPU of" should be --CPU or--.

Col. 4, line 52, "MCUID" shoudl be --MCU-ID--.

Col. 7, line 35, delete "to".

Col. 8, line 61, "SIA-CT" should be --STA-CT--.

Col. 12 (claim 7), line 50, judgment" should be --judging--.

Signed and Sealed this

Twenty-fourth Day of May, 1994

Attest:

BRUCE LEHMAN

*Attesting Officer*        *Commissioner of Patents and Trademarks*